United States Patent Office 3,357,973
Patented Dec. 12, 1967

3,357,973
7α-MONO- AND DIHALOMETHYL STEROIDS
Colin C. Beard, Boulder, Colo., and Alexander D. Cross, Mexico City, Mexico, assignors to Syntex Corporation, Panama, Panama, a corporation of Panama
No Drawing. Filed Dec. 13, 1965, Ser. No. 513,548
17 Claims. (Cl. 260—239.55)

This is a continuation-in-part of Serial No. 486,226, filed September 9, 1965.

This invention relates to novel steroids and to their preparation. More particularly this invention pertains to compounds represented by the formula:

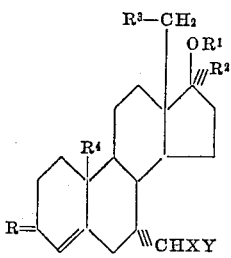

wherein R represents an oxygen atom or the group

in which $R^5$ represents hydrogen, tetrahydropyranyl, or a hydrocarbon carboxylic acyl group;

$R^1$ represents hydrogen, tetrahydropyranyl, or a hydrocarbon carboxylic acyl group;

$R^2$ represents hydrogen, cyclopropyl, (lower)alkyl, (lower)alkenyl, (lower)alkylnyl, or halo(lower)alkynyl group;

Each of $R^3$ and $R^4$ represents hydrogen or methyl;

X represents hydrogen, chloro, or fluoro; and

Y represents chloro or fluoro.

By the term (lower)alkyl and derivations thereof including halo(lower)alkynyl is meant a monovalent, branched or straight-chain aliphatic radical, containing 6 or less carbon atoms. Thus, typical members of such (lower)alkyl groups are methyl, ethyl, propyl, butyl, pentyl, and hexyl; of such (lower)alkenyl groups are vinyl, propargyl, and the like; of such (lower)alkynyl groups are ethynyl, propynyl, and the like; and of such halo(lower)alkynyl groups are chloroethynyl, chloropropynyl, and the like.

By the term hydrocarbon carboxylic acyl group is intended an acyl group containing less than 12 carbon atoms thereby providing such ester groups as acetate, propionate, trimethylacetate, haloacetate, aminoacetate, benzoate, adamantoate, and the like.

The novel steroids of this invention, except those in which $R^2$ is alkynyl, are anabolic agents and are effective in the treatment of debilatory conditions such as are encountered in old age, post-operative recuperation, and the like. Those compounds in which $R^2$ is alkynyl, particularly ethynyl and haloethynyl, are progestational agents and are accordingly useful for the control and regulation of fertility.

The chemical transformation contemplated herein may be represented as follows:

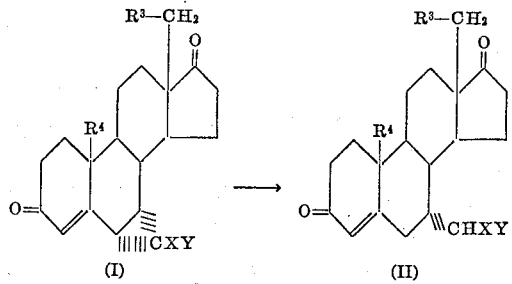

wherein $R^3$, $R^4$, X and Y are as previously defined.

The compounds represented by (I) above are prepared from the corresponding 4,6-dienes upon treatment with an alkali metal haloacetate such as sodium trifluoroacetate, sodium trichloroacetate, sodium chlorodifluoroacetate, sodium chlorofluoroacetate, and the like as described in copending Serial No. 486,226, filed September 9, 1965.

This invention thus involves the cleavage of a halocyclopropyl group fused to carbons 6 and 7 of the steroid nucleus (i.e., a 6,7-halomethylene) with reagents which effect the ring opening of the cyclopropyl group to provide the corresponding steroid containing a halomethyl group at position 7.

In the practice of this invention, a steroid containing a 6,7-fused halocyclopropyl group is treated in liquid medium at temperatures ranging from room temperature (about 25° C.) to 150° C. or more, preferably at atmospheric pressure, and for varying duration (usually at least 30 minutes and more) with reagents which effect opening of the fused cyclopropyl ring, such as zinc dust in acetic acid. Thereafter the product 7-halomethyl steroid is recovered via conventional methods such as chromatography.

Reagents which effect ring opening include zinc dust in commercial form such as activated (acid-washed) and amalgam combinations, e.g., a zinc-copper metal couple, in solvents such as the lower carboxylic acid, e.g., acetic, propionic, butyric, and the like; alcohols, e.g., methanol, ethanol, propanol, and the like; glycol-water mixtures, e.g., ethylene glycol-water mixture and the like; ethers, e.g., dioxane, tetrahydrofuran, ethyl ether, and the like; and hydrocarbons, e.g., pentane, hexane, and the like.

More complete illustration of the instant invention is provided by the discussion and examples which follow.

After the ring opening has been effected as described above, other parts of the molecule may be elaborated. This elaboration is preferably performed at C–17 followed by subsequent substitution at C–3.

After the 3-keto group has been selectively protected such as by forming the corresponding enol ether by treatment with ethylorthoformate in the presence of p-toluenesulfonic acid, C–17 elaboration is thereafter performed as follows:

The 17-keto group may be treated with an organometallic such as alkyl lithium, alkenyl lithium, alkynyl lithium or alkyl magnesium halide, alkenyl magnesium halide, or alkynyl magnesium halide which provides the corresponding 17α-aliphatic-17β-ols. The 17α-alkyl and alkenyl group such as ethyl or vinyl may be alternatively provided through controlled hydrogenation of the 17α-alkynyl group such as ethynyl. The 17α-vinyl may in turn be converted to 17α-cyclopropyl upon treatment with an iodo methyl metal iodide such as is provided by a combination of methylene iodide and zinc-copper couple.

In lieu of the process described above, the 17-keto may be reduced such as by treatment with sodium borohydride in methanol or lithium aluminum hydride in tetrahydrofuran to give the corresponding 17β-hydroxy compound, unsubstituted in the 17α position.

The secondary 17β-ols may be esterified by an acylating agent such as acetic anhydride in pyridine. Esterification of the tertiary 17β-hydroxyl is done with an acylating agent in the presence of an acid such as p-toluenesulfonic acid and the like. Etherification of the 17β-hydroxyl with dihydropyran in the presence of p-toluenesulfonic acid affords the 17β-tetrahydropyranyl ether.

The protecting group at C–3 is removed in the usual manner such as by acidic treatment to afford the corresponding 3-keto compound, fully substituted at C–17 as provided above.

This 3-keto group may also be reduced such as with sodium borohydride as described above for the 17-keto to give the 3β-hydroxyl. This secondary hydroxyl may be esterified as described above to afford the 3β-ester. It may alternatively be etherified with dihydropyran in the presence of p-toluenesulfonyl chloride to give the 3β-tetrahydropyranyl ether.

The following examples serve to illustrate the invention more fully but are not intended to be limiting except insofar as provided in the appended claims.

Example 1

To a stirred, refluxing solution of 1 g. of estra-4,6-diene-3,17-dione in 15 ml. of dimethyl triethylene glycol ether is added in a dropwise fashion a 50% w./v. solution of sodium trifluoroacetate in dimethyl triethylene glycol ether. When the further addition of reagent fails to effect a change in the U.V. spectrum, the addition is stopped. The mixture is cooled and filtered. The filtrate is evaporated to dryness and the residue is chromatographed on alumina with methylene chloride to yield 6α,7α-difluoromethyleneestr-4-ene-3,17-dione.

In a like manner, 6α,7α-difluoromethyleneandrost-4-ene-3,17-dione and 6α,7α-difluoromethylene-18-methylestr-4-ene-3,17-dione are prepared.

By substituting sodium trichloroacetate in the procedure of this example, there is obtained the corresponding 6α,7α-dichloromethylene derivatives. Likewise, the use of sodium chlorofluoroacetate results in the monofluoro derivatives, namely, 6α,7α-fluoromethyleneestr-4-ene-3,17-dione; 6α,7α-fluoromethyleneandrost-4-ene-3,17 - dione, and 6α,7α-fluoromethylene-18-methylestr - 4 - ene-3,17-dione.

Example 2

A stirred solution of 16 g. of 6α,7α-difluoromethyleneestr-4-ene-3,17-dione in 5 ml. of acetic acid is heated at reflux for 1 hour with several portions of zinc dust. The mixture is then stirred at room temperature for 1 hour, filtered, the residue being washed with acetic acid, and diluted with 10 ml. of water. This mixture is extracted with methylene chloride and the methylene chloride extracts are in turn washed with water, 2 N sodium bicarbonate solution, and water. After drying this organic solution with magnesium sulfate, it is evaporated to dryness and chromatographed on alumina with hexane: methylene chloride followed by methylene chloride:ethyl acetate to yield 7α-difluoromethylestr-4-ene-3,17-dione.

In a like manner, the use of zinc-copper couple in methanol and zinc dust in tetrahydrofuran in lieu of zinc dust in acetic acid affords the same result.

Example 3

The compounds listed under II below are prepared from the compounds listed under I below following the procedure of Example 2.

| I | II |
| --- | --- |
| 6α, 7α-difluoromethyleneandrost-4-ene-3,17-dione. | 7α-difluoromethylandrost-4-ene-3, 17-dione. |
| 6α, 7α-difluoromethylene-18-methylestr-4-ene-3,17-dione. | 7α-difluoromethyl-18-methylestr-4-ene-3,17-dione. |
| 6α,7α-dichloromethyleneestr-4-ene-3,17dione. | 7α-dichloromethylestr-4-ene-3,17-dione. |
| 6α,7α-chloromethylene-18-methylestr-3-ene-3,17-dione. | 7α-chloromethyl-18-methylestr-4-ene-3,17-dione. |

Example 4

To a suspension of 1 g. of 7α-difluoromethylestr-4-ene-3,17-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until a solid forms. The solid then formed is collected by filtration, washed with water and air dried to yield 3-ethoxy-7α-difluoromethylestra-3,5(6)-dien-17-one which is crystallized from acetone:hexane.

A solution of 1 g. of sodium borohydride in 3 ml. of water is added to an ice-cooled solution of 1 g. of 3-ethoxy-7α-difluoromethylestra-3,5(6)-dien-17-one in 120 ml. of methanol and the mixture is then allowed to stand for 16 hours at room temperature. The excess reagent is decomposed by addition of acetic acid and the solution is then concentrated to a small volume in vacuum and diluted with water. The product is extracted with ethyl acetate and these extracts are washed with water, dried and evaporated to yield 3-ethoxy-7α-difluoromethylestra-3,5(6)-dien-17β-ol which may be further purified by recrystallization from acetone:hexane.

To a solution of 1 g. of 3-ethoxy-7α-difluoromethylestra-3,5(6)-dien-17β-ol in 10 ml. of acetone are added a few drops of 36% hydrochloric acid. The mixture is heated a few minutes at steam bath temperatures, diluted with water and filtered. The solid thus collected is dried and recrystallized from acetone:hexane to yield 7α-difluoromethylestr-4-en-17β-ol-3-one.

A mixture of 1 g. of 7α-difluoromethylestra-4-en-17β-ol-3-one, 4 ml. of pyridine and 2 ml. of acetic anhydride is allowed to stand at room temperature for 15 hours. The mixture is then poured into ice water and the solid which forms is collected by filtration, washed with water and dried to yield 7α-difluoromethyl-17β-acetoxyestr-4-en-3-one which may be further purified through recrystallization from acetone:hexane.

Similarly prepared by the procedures of this example are 7α-difluoromethyl-17β-acetoxyandrost-4-en-3-one and 7α-difluoromethyl-17β-acetoxy-18-methylestr-4-en-3 - one from 7α-difluoromethylandrost-4-ene-3,17-dione and 7α-difluoromethyl - 18 - methylestr - 4 - ene - 3,17 - dione, respectively.

Example 5

Two milliliters of dihydropyran are added to a solution of 1 g. of 7α-difluoromethylestr-4-en-17β-ol-3-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 7α-difluoromethyl-17β-tetrahydropyranyloxyestr-4 - en -3-one.

Similarly, 7α-difluoromethyl-17β-tetrahydropyranyloxyandrost-4-en-3-one and 7α-difluoromethyl-17β-tetrahydropyranyloxy-18-methylestr-4-en-3-one are prepared.

Example 6

A mixture of 2 g. of 7α-difluoromethylestr-4-en-17β-ol-3-one in 8 ml. of pyridine and 4 ml. of adamantoyl chloride is heated at steam bath temperature for one hour. The mixture is then poured into ice water and the solid which forms is collected by filtration, washed with water, and dried to yield 7α-difluoromethyl-17β-adamantoyloxyestr-4-en-3-one which is further purified through recrystallization from methylene chloride:hexane.

Similarly, 7α - difluoromethyl - 17β-adamantoyloxyandrost - 4 - en- 3 - one and 7α - difluoromethyl - 17β-adamantoyloxy - 18 - methylestr - 4 - en - 3 - one are prepared.

Example 7

A solution of 5 g. of 3-ethoxy-7α-difluoromethylestra-3,5(6)-dien-17-one in 250 ml. of thiophen-free benzene is treated with an equimolar amount of methylmagnesium bromide in anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 3-ethoxy-7α-difluoromethyl-17α-methylestra-3,5(6)-dien-17β-ol which is recrystallized from methylene chloride:hexane.

This compound is hydrolyzed with acid following the procedure set forth in the third paragraph of Example 4 to yield 7α-difluoromethyl-17α-methylestr-4-en-17β-ol-3-one.

Similar to the procedure of this example are prepared 7α - difluoromethyl - 17α - methylandrost - 4 - en - 17β-ol-3-one and 7α-difluoromethyl-17α,18-dimethylestr-4-en-17β-ol-3-one.

Example 8

To a stirred solution of 2 g. of 3-ethoxy-7α-difluoromethylestra-3,5(6)-dien-17-one in 250 ml. of absolute ether is added in a dropwise fashion and under nitrogen, an ethereal solution of 10 molar equivalents of ethyl lithium. The mixture is then stirred for 48 hours at room temperature, poured into water, acidified with hydrochloric acid and stirred vigorously for 1 hour. The ethereal phase is separated, washed with water to neutrality, dried over sodium sulfate and evaporated to dryness to yield 3 - ethoxy - 7α - difluoromethyl - 17α - ethylestra - 3,5(6)-dien-17β-ol which is further purified through recrystallization from acetone:hexane.

Upon hydrolysis with acid according to the procedure of Example 4 is yielded 7α-difluoromethyl-17α-ethylestr-4-en-17β-ol-3-one.

By a similar procedure, 7α-difluoromethyl-17α-ethylandrost - 4 - en - 17β - ol - 3 - one and 7α - difluoromethyl - 17α - ethyl - 18 - methylestr - 4 - en - 17β - ol-3-one are prepared.

Example 9

A solution of 8.5 g. of 1,2-dichloroethylene in 50 ml. of anhydrous ether is added in a dropwise fashion, under nitrogen and at 0° C. over a 30 minute period to a stirred solution of 15 ml. of 1.4 N methyl lithium in anhydrous ether. After stirring for an additional 90 minutes, at room temperature, a solution of 0.5 g. of 3-ethoxy-7α-difluoromethylestra-3,5(6)-dien-17-one in 20 ml. of anhydrous ether is added in a dropwise fashion with stirring over a 15 minute period. Stirring at room temperature is continued for 18 hours, and the reaction mixture is then poured into ice water and extracted with ether. These extracts are washed with water, dried over sodium sulfate and concentrated under reduced pressure. The residue is chromatographed on alkaline alumina with 8:2 hexane:ether to yield 3-ethoxy-7α-difluoromethyl-17α-chloroethynylestra-3,5(6)-dien-17β-ol which is further purified through recrystallization from acetone:hexane.

Hydrolysis with acid by the method recited in Example 4 affords 7α-difluoromethyl-17α-chloroethynylestr-4-en-17β-ol-3-one.

By this procedure, 7α-difluoromethyl-17α-chloroethynylandrost - 4 - en - 17β - ol - 3 - one and 7α - difluoromethyl - 17α - chloroethynyl - 18-methylestr-4-en-17β-ol-3-one are prepared.

Example 10

A solution of 1 g. of 3-ethoxy-7α-difluoromethylestra-3,5(6)-dien-17-one in 30 ml. of anhydrous benzene is added under nitrogen to a solution of 1.4 g. of potassium in 30 ml. of t-amyl alcohol. A slow current of purified acetylene is then passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 3-ethoxy - 7α - difluoromethyl-17α-ethynylestra-3,5(6)-dien-17β-ol which is recrystallized from acetone:hexane.

Hydrolysis with acid by the procedure of Example 4 yields 7α - difluoromethyl-17α-ethynylestr-4-en-17β-ol-3-one.

Similarly, 7α - difluoromethyl - 17α - ethynylandrost-4-en-17β-ol-3-one and 7α-difluoromethyl-17α-ethynyl-18-methylestr-4-en-17β-ol-3-one are prepared.

Example 11

A mixture of 1 g. of 7α-difluoromethyl-17α-ethynylestr-4-en-17β-ol-3-one, 1 g. of p-toluenesulfonic acid monohydrate, 50 ml. of acetic acid, and 25 ml. of acetic anhydride is allowed to stand at room temperature for 24 hours, and then poured into water and stirred. This mixture is then extracted with methylene chloride and these extracts are dried and evaporated to yield 7α-difluoromethyl - 17α - ethynyl - 17β - acetoxyestr - 4 - en - 3 - one which is recrystallized from acetone:ether.

Likewise, the other 17α-aliphatic-17β-ols of this invention are converted to the corresponding 17β- acetates.

By a similar procedure as that presented above, the use of propionic anhydride in lieu of acetic anhydride provides the corresponding 17β-propionyloxy compounds.

Example 12

A solution of 1 g. of 3-ethoxy-7α-difluoromethyl-17α-ethynylestra-3,5(6)-dien-17β-ol in 40 ml. of pyridine is hydrogenated at 25° C. atmospheric pressure in the presence of 0.4 g. of prehydrogenated 2% palladium-on-calcium carbonate. When 1.1 molar equivalents of hydrogen are absorbed, the reaction is stopped. The catalyst is removed by filtration through Celite diatomaceous earth and washed with ethyl acetate and the combined filtrate and washings are evaporated to dryness under reduced pressure. The residue is dissolved in ethyl acetate and this solution then washed with dilute hydrochloric acid and water to neutrality, dried and evaporated to dryness to yield 3-ethoxy-7α-difluoromethyl-17α-vinylestra-3,5,(6)-dien-17β-ol which is further purified through recrystallization from acetone.

Hydrolysis with acid according to the procedure of Example 4 gives 7α-difluoromethyl-17α-vinylestr-4-en-17β-ol-3-one.

Thereafter, the 17β-ol is esterified according to the procedure of Example 11 to yield 7α-difluoromethyl-17α-vinyl-17β-acetoxyestr-4-en-3-one.

The 17β-ol is etherified by the procedure of Example 5 to give the corresponding 17β-tetrahydropyranyloxy compound.

Example 13

A solution of 3 g. of 3-ethoxy-7α-difluoromethyl-17α-ethynylestra-3,5(6)-dien-17β-ol in 125 ml. of dioxane is hydrogenated at 25° C./570 mm. with 0.5 g. of pre-hydrogenated 10% palladium-on-charcoal. Upon the consumption of the theoretical amount of hydrogen, the solution is filtered and the filtrate evaporated to dryness under reduced pressure to yield 3-ethoxy-7α-difluoromethyl-17α-ethylestra-3,5(6)-dien-17β-ol which is recrystallized from acetone.

Hydrolysis with acid according to the procedure of Example 4 gives 7α-difluoromethyl-17α-ethylestr-4-en-17β-ol-3-one.

Thereafter, the 17β-ol is esterified according to the procedure of Example 11 to yield 7α-difluoromethyl-17α-ethyl-17β-acetoxyestr-4-en-3-one.

The 17β-ol is etherified by the procedure of Example 5 to give the corresponding 17β - tetrahydropyranyloxy compound.

*Example 14*

A mixture of 7 g. of methylene iodide and 3 g. of zinc-copper couple in 15 ml. of anhydrous ether is heated at reflux under nitrogen for 3 hours. The mixture is then cooled and 2 g. of 7α-difluoromethyl-17α-vinylestr-4-en-17β-ol-3-one are added. This mixture is allowed to stand at room temperature for 2 hours and is then poured into 200 ml. of 2% aqueous sodium carbonate and extracted twice with 100 ml. portions of ether. These extracts are dried over sodium sulfate and evaporated under reduced pressure. The residue is held at 0.01 mm. to remove any unreacted methylene iodide and then recrystallized from hexane to yield 7α-difluoromethyl-17α-cyclopropylestr-4-en-17β-ol-3-one.

*Example 15*

A solution of 1 g. of sodium borohydride in 3 ml. of water is added to an ice-cooled solution of 1 g. of 7α-difluoromethyl-17α-ethylestr-4-en-17β-ol-3-one in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 7α-difluoromethyl-17α-ethylestr-4-en-3β,17β-diol which may be further purified by recrystallization from acetone:hexane.

Similarly, the other 3-keto-17 substituted steroids of this invention are reduced to the corresponding 3-hydroxy-17 substituted steroids.

*Example 16*

7α-difluoromethyl-17β-acetoxyestr-4-en-3-one is reduced according to the procedure of Example 15 yielding 7α-difluoromethyl-17β-acetoxyestr-4-en-3-ol.

Two milliliters of dihydropyran are added to a solution of 1 g. of 7α-difluoromethyl-17β-acetoxyestr-4-en-3-ol in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β-tetrahydropyranyloxy - 7α - difluoromethyl - 17β - acetoxyestr-4-ene which is recrystallized from pentane.

A solution of 1 g. of 3β-tetrahydropyranyloxy-7α-difluoromethyl-17β-acetoxyestr-4-ene in 50 ml. of methanol is heated at reflux for 3 hours with a solution of potassium hydroxide in 1 ml. of water. The reaction mixture is then poured into ice water and the solid which forms collected by filtration, washed with water to neutrality and dried to yield 3β-tetrahydropyranyloxy-7α-difluoromethylestr-4-ene-17β-ol which is recrystallized from methylene chloride:ether.

By a similar procedure as outlined in this example 3β-tetrahydropyranyloxy - 7α - difluoromethyl-17α - ethynyl-18-methylestr-4-en-17β-ol is prepared. The other 3β-tetrahydropyranyloxy-17 substituted steroids are likewise prepared by the procedure of this example.

The 3β,17β-bis-tetrahydropyranyl ethers of the corresponding 3β,17β-diols are prepared by using double the molar quantity of dihydropyran.

*Example 17*

7α-difluoromethyl - 17α - ethynylestr-4-en-17β-ol-3-one is reduced with sodium borohydride according to the procedure of Example 15 thus giving 7α-difluoromethyl-17α-ethynylestr-4-ene-3β,17β-diol.

A mixture of 1 g. of 7α-difluoromethyl-17α-ethynyl-estr-4-ene-3β,17β-diol, 4 ml. of pyridine and 2 ml. of acetic hydride is allowed to stand at room temperature for 15 hours. The mixture is then poured into ice water and the solid which forms is collected by filtration, washed with water and dried to yield 3β-acetoxy-7α-difluoromethyl-17α-ethynylestr-4-en-17β-ol which may be further purified through recrystallization from acetone:hexane.

Similarly, the other 3β-hydroxy-17 substituted steroids of this invention are converted to the corresponding steroids having the 3β-acetoxy group.

The procedures of the foregoing examples may be used with the corresponding steroids containing the 7α-fluoromethyl group or the 7α-dichloromethyl group in lieu of the 7α-difluoromethyl group illustrated therein.

What is claimed is:
1. Steroids of the formula

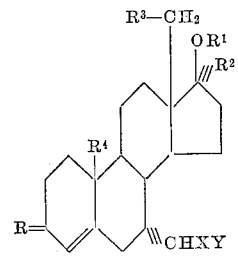

wherein R represents an oxygen atom or the group

in which $R^5$ represents hydrogen, tetrahydropyranyl, or a hydrocarbon carboxylic acyl group of less than 12 carbon atoms;

$R^1$ represents hydrogen, tetrahydropyranyl, or a hydrocarbon carboxylic acyl group of less than 12 carbon atoms;

$R^2$ represents hydrogen, cyclopropyl, (lower)alkyl, (lower)alkenyl, (lower)alkynyl, or halo(lower)alkynyl group;

each of $R^1$, $R^2$, $R^3$, $R^4$, X and Y is as therein defined and

X represents hydrogen, chloro, or fluoro; and

Y represents chloro or fluoro.

2. Steroids of claim 1 wherein
each of R, $R^1$, $R^2$, $R^3$, and $R^4$ is as therein defined and each of X and Y is fluoro.

3. Steroids of claim 2 wherein
each of $R^1$, $R^2$, $R^3$, $R^4$, X and Y is as therein defined and
R is an oxygen atom.

4. A steroid of claim 1 wherein
R is an oxygen atom;
$R^1$ is hydrogen;
$R^2$ is methyl;
$R^3$ is hydrogen;
$R^4$ is hydrogen;
X is fluoro; and
Y is fluoro.

5. A steroid of claim 1 wherein
R is an oxygen atom;
$R^1$ is hydrogen;
$R^2$ is methyl;
$R^3$ is hydrogen;
$R^4$ is methyl;
X is fluoro; and
Y is fluoro.

6. A steroid of claim 1 wherein
R is an oxygen atom;
$R^1$ is hydrogen;

$R^2$ is ethyl;
$R^3$ is methyl;
$R^4$ is hydrogen;
X is fluoro; and
Y is fluoro.
7. A steroid of claim 1 wherein
R is an oxygen atom;
$R^1$ is hydrogen;
$R^2$ is ethynyl;
$R^3$ is methyl;
$R^4$ is hydrogen;
X is fluoro; and
Y is fluoro.
8. A steroid of claim 1 wherein
R is the group

in which $R^5$ is acetyl;
$R^1$ is acetyl;
$R^2$ is ethynyl;
$R^3$ is hydrogen;
$R^4$ is hydrogen;
X is fluoro; and
Y is fluoro.
9. A steroid of claim 1 wherein
R is the group

in which $R^5$ is acetyl;
$R^1$ is acetyl;
$R^2$ is ethynyl;
$R^3$ is hydrogen;
$R^4$ is methyl;
X is fluoro; and
Y is fluoro.
10. A steroid of claim 1 wherein
R is an oxygen atom;
$R^1$ is adamantoyl;
$R^2$ is hydrogen;
$R^3$ is methyl;
$R^4$ is hydrogen;
X is fluoro; and
Y is fluoro.
11. A steroid of claim 1 wherein
R is an oxygen atom;
$R^1$ is tetrahydropyranyl;
$R^2$ is hydrogen;
$R^3$ is methyl;
$R^4$ is hydrogen;
X is fluoro; and
Y is fluoro.
12. A steroid of claim 1 wherein
R is the group

in which $R^5$ is tetrahydropyranyl;
$R^1$ is hydrogen;
$R^2$ is ethynyl;
$R^3$ is methyl;
$R^4$ is hydrogen;
X is fluoro; and
Y is fluoro.
13. A steroid of claim 1 wherein
R is an oxygen atom;
$R^1$ is acetyl;
$R^2$ is ethynyl;
$R^3$ is hydrogen;
$R^4$ is hydrogen;
X is fluoro; and
Y is fluoro.
14. A steroid of claim 1 wherein
R is an oxygen atom;
$R^1$ is acetyl;
$R^2$ is ethynyl;
$R^3$ is hydrogen;
$R^4$ is methyl;
X is fluoro; and
Y is fluoro.
15. A process which comprises treating a 3-keto-$\Delta^4$ steroid having a 6,7-fused halomethylene group with a ring opening reagent selected from the group consisting of zinc and zinc amalgam combinations in an inert solvent to cleave said fused halomethylene group and give the corresponding 3-keto-$\Delta^4$-7-halomethyl steroid.
16. The process according to claim 15 wherein said ring opening reagent is zinc dust and said inert solvent is acetic acid.
17. The process according to claim 16 wherein said treatment is conducted at from 25° C. to 150° C.

References Cited

UNITED STATES PATENTS 3,047,566  7/1962  Godtfredsen et al. __ 260—239.55

LEWIS GOTTS, *Primary Examiner.*

H. FRENCH, *Assistant Examiner.*

UNITED STATES PATENT OFFICE
CERTIFICATE OF CORRECTION

Patent No. 3,357,973            December 12, 1967

Colin C. Beard et al.

It is hereby certified that error appears in the above numbered patent requiring correction and that the said Letters Patent should read as corrected below.

Column 8, line 46, after "group;" insert -- each of $R^3$ and $R^4$ represents hydrogen or methyl; --.

Signed and sealed this 15th day of April 1969.

(SEAL)
Attest:

Edward M. Fletcher, Jr.           EDWARD J. BRENNER
Attesting Officer           Commissioner of Patents